United States Patent [19]

Dzung et al.

[11] Patent Number: 5,153,391

[45] Date of Patent: Oct. 6, 1992

[54] BINARY CODED DECIMAL (BCD) SWITCH ASSEMBLY WITH INTEGRAL CHIP

[75] Inventors: John C. Dzung, Sunrise; Donald F. Gatto, Coral Springs; Loi M. Tran, N. Lauderdale, all of Fla.

[73] Assignee: Motorola, Inc., Schaumburg, Ill.

[21] Appl. No.: 720,052

[22] Filed: Jun. 24, 1991

[51] Int. Cl.⁵ .................... H01H 19/54; H03K 17/94
[52] U.S. Cl. ........................... 200/11 R; 200/11 DA
[58] Field of Search ............ 200/11 R, 11 D, 11 DA, 200/11 G, 11 J, 11 TW, 292, 571; 174/252-268

[56] References Cited

U.S. PATENT DOCUMENTS 3,684,830  8/1972  Maclagan et al. ........... 200/11 D X
4,441,098  4/1984  Borras et al. ................... 341/20
5,017,741  5/1991  Brown et al. .................... 174/260
5,086,200  2/1992  Kline et al. .................. 200/11 R X

OTHER PUBLICATIONS

Sales Bulletin Number 438 from Grayhill, Inc., 1989.

Primary Examiner—J. R. Scott
Attorney, Agent, or Firm—Juliana Agon

[57] ABSTRACT

A multi-position switch (100), comprises an integral integrated circuit (66) for encoding one of a plurality of switch inputs (66) into a combination of a lesser quantity of switch outputs (57) and a miniaturized rotor (15) and stator (60) arrangement for selecting (50) one (62) of the plurality of switch inputs (53) corresponding to a selected switch position.

8 Claims, 2 Drawing Sheets

BINARY CODED DECIMAL (BCD) SWITCH ASSEMBLY WITH INTEGRAL CHIP

BACKGROUND OF THE INVENTION

This invention relates to controls for electronic devices and more particularly to coded switches having less terminals than switchable positions.

With the miniaturization of electronic devices and the provision of complex circuits in extremely small packages, there are many applications in which a miniature multi-position electrical switch is required. In such applications, there may be a need for selectively connecting circuits on a printed circuit board (PCB).

For example, a switch selector is often selectively actuated by an operator of an electronic device, such as a portable two-way radio, to select a desired communication channel. Often, this switch selector is a one position-to-one terminal switch where the number of terminals correspond to the number of positions available on the switch. To select the channels of the radio, the multi-position switch is interfaced with a digital frequency synthesizer by means of a control integrated circuit (IC) which requires a binary encoding of the selected switch position. In one prior art method, a separate encoding circuit external to the multi-position switch, encodes the selected switch position by means of a variable amount of delay generated by diodes or resistors.

To save the space occupied by the multi-terminals of the multi-position switch contacting the external encoding circuit on the printed circuit board of the radio, a second prior art method mechanically incorporates the encoding circuit onto the multi-position switch to form a mechanical binary coded switch. In one mechanical binary coded decimal (BCD) 16 position switch, a five-legged or seven-legged contact rotates on top of a printed circuit board to generate sixteen distinct switch combinations corresponding to the sixteen positions via the coded outputs of four output terminals and a ground.

However, there are significant drawbacks to this mechanical BCD switch. The design goal is to design a miniaturized switch small enough to fit onto a portable radio and perform reliably. However, a low production yield of this mechanical BCD switch occurs because it is a significant mechanical challenge to align a five-legged spring contact onto five tiny printed circuit board runners with all the stack tolerances of such a small BCD switch assembly. Yet, the switch design is still not small enough. This is because the alignment and tolerance problems between the multi-legged contact and the dense printed circuit board runners of the current mechanical BCD switch cannot be made any smaller. Depending on the layout of the printed circuit board, the spring contact may even be seven legged which results in even harder alignment problems. Therefore, it is a desire to significantly improve the reliability of the present mechanical BCD switch and reduce its size and cost by eliminating the mechanical density of the conventional switch mechanism which requires a multi-legged contact and a printed circuit board with small runners.

SUMMARY OF THE INVENTION

Accordingly, a small printed circuit board of an electrical BCD switch contains a miniature wire bonded integrated circuit (IC) chip integral to the switch and a two-point contact having one point for ground and the other point for the selected switch position.

Briefly, a multi-position switch comprises an integral integrated circuit for encoding one of a plurality of switch inputs into a combination of a lesser quantity of switch outputs and a miniaturized rotor and stator arrangement for selecting one of the plurality of switch inputs corresponding to a selected switch position.

DESCRIPTION OF THE PREFERRED EMBODIMENT

Figure 1:
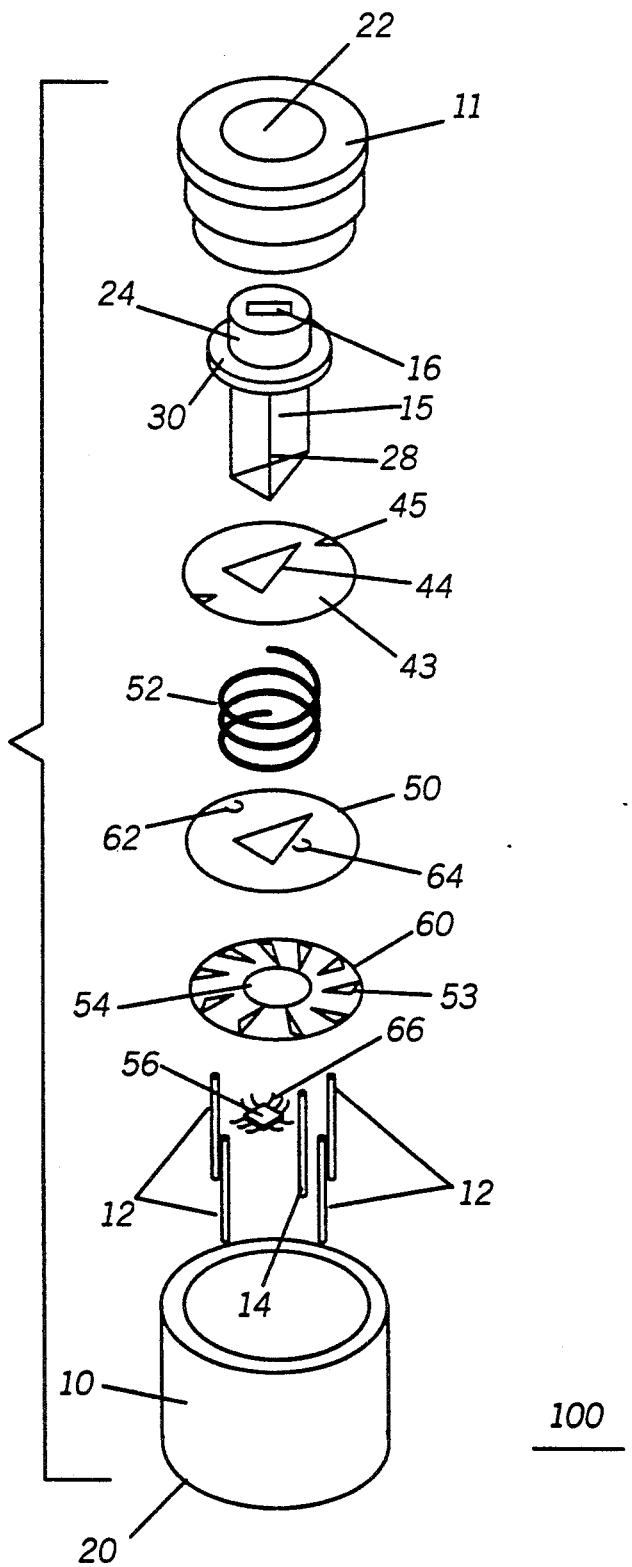
FIG. 1 is an electrical coded switch in accordance with the invention.

Referring to FIG. 1, a miniature multi-position switch assembly 100, which may be accessible via an opening on top of a housing assembly of a two-way portable radio, is shown. The concepts of the present invention can be used for any multi-position switch, but a sixteen position rotary switch is shown as an example. This miniature sixteen position switch assembly 100 includes a switch housing 10 covered by a housing cover 11 and having a plurality of terminals 12 and 14 lesser than the number of positions, all extending from one end 20 of the housing 10 when assembled. Four outer terminals 12 provide the coded combination of outputs for each of the sixteen positions of the switch.

Any one of a plurality of position contacts 53 may be selectively grounded to generate all the possible output combinations out of the four terminals 12. To select the reception and transmission channels of the radio via a digital synthesizer or any other radio functions, the switch assembly 100 is coupled to the printed circuitry of a radio circuit or printed board. The terminals 12 and 14 are preferably soldered to the printed circuit board (PCB) via corresponding PCB openings.

At the opposite end of the switch housing 10, an actuator, a rotor, or a switch stem 15 is provided having a screw driver slot 16 for rotating the actuator 15 to select a position. An indicator on a channel selecting knob or any other knobs such as a volume control knob assembled above the actuator 15 indicates the position of the switch with the positions being numbered around the annular end of the knob or around the opening of the radio housing.

Figure 2:
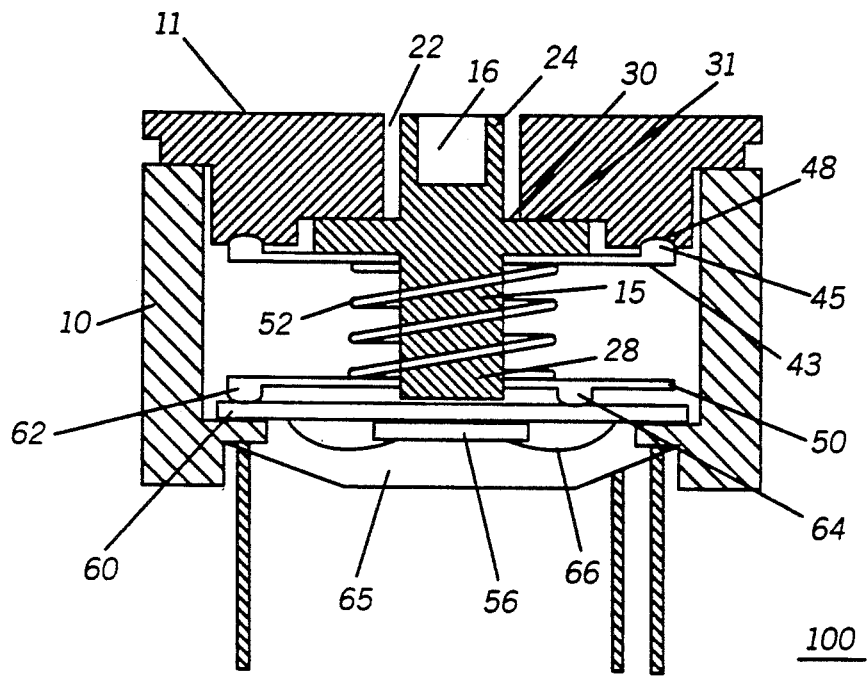
FIG. 2 is a cross-sectional view of the electrical coded switch of FIG. 1.

Referring to FIG. 2, a cross-sectional view of the switch assembly 100 of FIG. 1 is shown. The following description refers to both FIGS. 1 and 2 for one possible implementation of an integral IC switch. The housing cover 11 has an opening 22 for receiving a projecting part 24 of the actuator 15 with the part 24 serving to center the actuator 15 within the housing cover 11. In addition, the actuator 15 has a recessed edge 30 which engages a shoulder 31 in the housing cover 11 to accurately position the actuator 15. Within the switch housing 10, a shaft or stem 28 of the actuator 15 slips through a triangular opening 44 (as seen in FIG. 1) of a detent disk 43 and the center of a coil spring 52.

The detent disk 43 has a set of triangular raised portions 45 located at the edge of a diagonal of the detent disk 43 which engage a corresponding set of recessed portions 48 on the bottom surface of the housing cover 11 to provide a detent action. If the positions are uniformly located, the detent positions may be at substantially 22.5° with respect to each of the sixteen positions.

Also slipped around the actuator stem 28, a contact disk 50 having two points of contact is spring biased downwardly by the coil spring 52 to engage one of a plurality of contacts 53 in an insulating end plate or printed circuit board which serves as the stator 60 of the switch. On the bottom side of the contact disk 50, there is a contact protrusion 62 and a ground protrusion 64 positioned underneath at 180° for contacting the respective contact 53 of one of the switch position and a common ground contact 54 on the insulated end plate 60.

Figure 3:
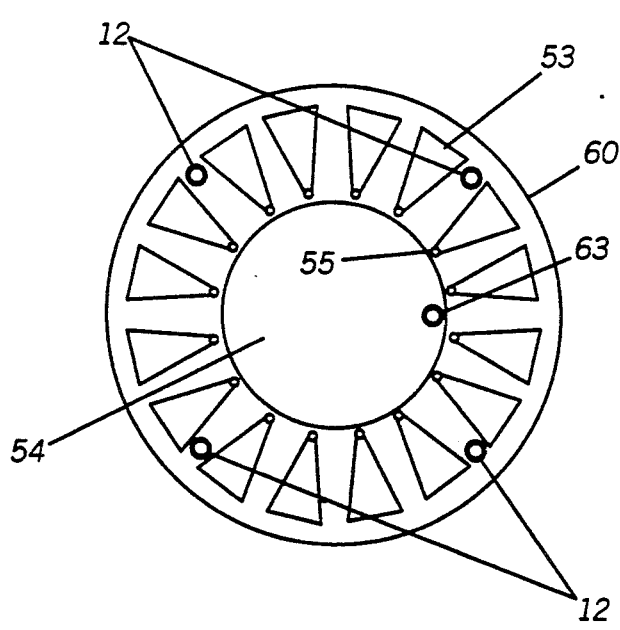
FIG. 3 is a top view of the metallized substrate of FIG. 2.
Figure 4:
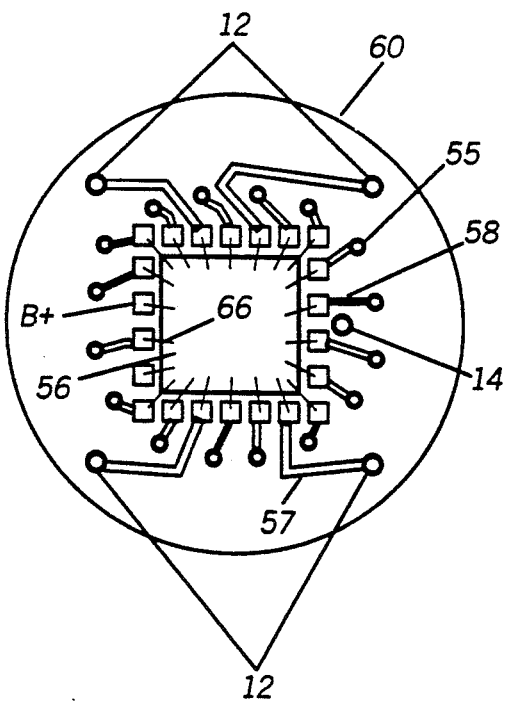
FIG. 4 is a bottom view of the metallized substrate of FIG. 2.

Contacts 53 are more clearly shown in FIG. 1 and FIG. 3. FIG. 3 is a top view showing the contact pattern on top of the metallized substrate or insulating end plate, of the stator 60 and FIG. 4 is a bottom view of the die pattern underneath the metallized substrate or insulating end plate of the stator 60. In the following description, the switch structure shown in these views and by the views of FIGS. 1 and 2 will be referred to together. Contacts 53 are radially disposed from the ground center contact 54 which is connected to the ground terminal 14 via a metallized through-hole 63. The contacts 53 are connected to the die pattern underneath via the metallized through-holes 55 connecting the contact pattern of contacts 53 on the top side of the insulating end plate or printed circuit board of the stator 60 to the bottom die pattern provided to receive an integrated circuit chip (IC) 56. On the bottom of the insulating end pate of the stator 60, runners 58 connect the top contact pattern (53 via the through-holes 55) to the IC 56 while runners 57 connect the outputs of the IC 56 to the terminals 12.

As can be seen, the integral integrated circuit (IC) has at least a plurality of inputs connected to like plurality of contacts 53 and a lesser quantity of outputs connected to a plurality of switch terminals 12 lesser than the plurality of switch positions. The IC 56 is a common priority encoder. In this embodiment, the IC is a sixteen bit priority encoder capable of binary coded decimal (BCD) encoding attached to the bottom of the insulating end plate of the stator 60 by way of wire bonds 66. A common epoxy such as glop top 65 or other suitable material insulates and protects the IC 56.

As shown in FIG. 2, the switch parts are assembled in the housing 10 with the actuator 15 in the end of the housing and having the projecting part within the opening 22 of the housing cover 11. The end plate of the stator 60 is positioned against the actuator or rotor 15 holding the contact disk 50 in position. The end 20 of the housing 10 is formed over the edge of the end plate of the stator 60 by the glop top 65 to hold the various parts which have been described in assembled relation.

In operation, the IC chip 56 of the electrical BCD switch 100 converts the sixteen positions inputs connected to the runners 58, into a four port output (12) and a ground 14 when one of the sixteen distinct contact positions 53 on top of the insulative end plate or printed circuit board of the stator 60 mates with the two-point contact disk 50 rotating on top of the rotor or printed circuit board of the stator 60. Since there is only one two-point contact 50 to mate with the printed circuit board of the stator 60, the design tolerance for parts alignment is significantly simpler than that of a five or seven-legged contact to mate with five tiny runners of a printed circuit board. The electrical BCD switch 100 can also be made programmable with a custom or programmable IC 56 to have a different starting position or various position combinations without mechanical changes. Therefore, using such a programmable IC 56, positions can be oriented by programming and not by mechanical features.

In summary, a better yield, higher reliability, smaller, and a less expensive switch can be realized in an electrical coded switch with a small printed circuit board containing a miniature wire bonded IC chip and a small two-point contact having one point for the ground and the other point for a selected switch position since the IC will electrically form the combination outputs for the output terminals instead of having a complicated mechanical contraption for doing the same.

What is claimed is:

1. A multi-position switch, comprising:
   a stator comprising a plurality of fixed contacts, a lesser plurality of switch terminals, and an integral encoding circuit having a plurality of switch inputs and a lesser plurality of switch outputs for encoding one of the plurality of switch inputs into a combination of switch outputs, each of the plurality of fixed contacts connected to each of the switch inputs and each of the lesser plurality of terminals connected to each of the switch outputs; and
   switching means having a moving contact for selecting one of the plurality of switch inputs corresponding to a selected switch position by providing a conductive path for a signal input from the moving contact to one of the plurality of fixed contacts and to a corresponding one of the plurality of inputs of the integral integrated circuit, as the switching means is moved to the selected switch position.

2. A multi-position switch, comprising:
   a stator comprising an integral integrated encoding circuit having a plurality of inputs and a lesser plurality of outputs, the stator having a plurality of contacts, each of the plurality of contacts connected to each of a like plurality of switch positions and to each of the inputs of the integrated encoding circuit; and
   a switch actuator for selecting one of the plurality of switch positions by electrically engaging one of the plurality of contacts to provide a conductive path for a signal input at one of the plurality of inputs of the integral integrated encoding circuit, as the switch actuator moves to the selected switch position;
   the integral integrated encoding circuit having the plurality of inputs connected to the like plurality of contacts and the lesser plurality of outputs connected to a plurality of switch terminals lesser than the plurality of switch positions for encoding the signal received at the selected one of the plurality of contacts into a coded combination of outputs provided at the lesser plurality of switch terminals.

3. The multi-position switch of claim 2, wherein the integrated circuit is a custom programmable integrated circuit.

4. A multi-position switch for a radio, comprising:
   a metallized substrate having opposed top and bottom sides, the top side including a contact pattern having a plurality of contacts, each of the plurality of contacts connected to each of a like plurality of switch positions for operating the radio, and the bottom side including a circuit receiving layout and a plurality of switch terminals lesser than the plurality of switch positions; and an integral integrated encoding circuit die having a plurality of inputs and a lesser plurality of outputs, the die disposed on the circuit receiving layout; and a switch actuator comprising at least a two pointed contact thereon for selecting one of the plurality of switch positions by electrically shorting one of the plurality of contacts to ground to provide a signal at one of the plurality of inputs of the integral integrated encoding circuit die, as the switch actuator moves to the selected switch position, wherein each of the plurality of inputs connected to the like plurality of contacts of the metallized substrate and the lesser plurality of outputs connected to the plurality of switch terminals for encoding the signal received at the selected one of the plurality of contacts into a coded combination of outputs provided at the lesser plurality of switch terminals.

5. The multi-position switch of claim 4, wherein the metallized substrate comprises a double-sided printed circuit board.

6. The multi-position switch of claim 4, wherein the metallized substrate comprises the plurality of contacts radially disposed around a common ground contact.

7. The multi-position switch of claim 6, wherein the two pointed contact engages a selected one of the plurality of radially disposed contacts and the ground contact to provide the signal input.

8. The multi-position switch of claim 4, wherein the opposed top and bottom sides of the metallized substrate are connected via metallized through-holes.

* * * * *